(12) United States Patent
Murakami et al.

(10) Patent No.: US 11,489,385 B2
(45) Date of Patent: Nov. 1, 2022

(54) ROTOR, ROTARY ELECTRIC MACHINE, AND METHOD FOR MANUFACTURING ROTOR

(71) Applicant: Mitsubishi Electric Corporation, Tokyo (JP)

(72) Inventors: Hiroki Murakami, Tokyo (JP); Yoshiki Okada, Tokyo (JP); Yoshiharu Takashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 133 days.

(21) Appl. No.: 16/605,535

(22) PCT Filed: Apr. 6, 2018

(86) PCT No.: PCT/JP2018/014741
§ 371 (c)(1),
(2) Date: Oct. 16, 2019

(87) PCT Pub. No.: WO2018/221008
PCT Pub. Date: Dec. 6, 2018

(65) Prior Publication Data
US 2020/0119606 A1    Apr. 16, 2020

(30) Foreign Application Priority Data
May 29, 2017  (JP) .............................. JP2017-105184

(51) Int. Cl.
*H02K 1/30* (2006.01)
*H02K 1/27* (2022.01)
(Continued)

(52) U.S. Cl.
CPC .............. *H02K 1/30* (2013.01); *H02K 1/278* (2013.01); *H02K 15/03* (2013.01); *H02K 15/12* (2013.01); *H02K 21/14* (2013.01)

(58) Field of Classification Search
CPC .......... H02K 1/30; H02K 1/278; H02K 15/03; H02K 15/12; H02K 21/14; H02K 2213/03;
(Continued)

(56) References Cited

U.S. PATENT DOCUMENTS

| 4,433,261 A | 2/1984 | Mashiki et al. |
| 4,531,071 A * | 7/1985 | Kintz, Jr. .............. H02K 1/276 310/156.28 |

(Continued)

FOREIGN PATENT DOCUMENTS

| CN | 101523699 A | 9/2009 |
| JP | S58163255 A | 9/1983 |

(Continued)

OTHER PUBLICATIONS

Office Action dated Mar. 11, 2021, issued in Chinese Patent Application No. 201880033382.4, 20 pages including 12 pages of English translation.

(Continued)

*Primary Examiner* — John K Kim
(74) *Attorney, Agent, or Firm* — Buchanan Ingersoll & Rooney PC

(57) ABSTRACT

A rotor includes: a plurality of permanent magnets divided at regular intervals in a circumferential direction around a shaft, and provided in an axial direction; a first protection ring for positioning and holding ends in the axial direction of the permanent magnets; a second protection ring for positioning and holding other ends in the axial direction of the permanent magnets; and a protection cover covering outer circumferential surfaces of the permanent magnets, the first protection ring, and the second protection ring, and having a uniform thickness in a radial direction.

20 Claims, 15 Drawing Sheets

(51) Int. Cl.
*H02K 15/03* (2006.01)
*H02K 15/12* (2006.01)
*H02K 21/14* (2006.01)
*H02K 1/278* (2022.01)

(58) Field of Classification Search
CPC .......... H02K 1/02; H02K 21/145; H02K 1/28; H02K 1/27
USPC .................................................... 310/156.28
See application file for complete search history.

(56) References Cited

U.S. PATENT DOCUMENTS

| | | | | |
|---|---|---|---|---|
| 4,633,113 | A * | 12/1986 | Patel | H02K 15/03 310/156.28 |
| 4,674,178 | A * | 6/1987 | Patel | H02K 1/278 29/598 |
| 5,140,210 | A * | 8/1992 | Shirakawa | H02K 1/278 310/156.28 |
| 6,047,461 | A | 4/2000 | Miura et al. | |
| 10,211,711 | B2 * | 2/2019 | Eckert | H02K 1/2706 |
| 2005/0235481 | A1 * | 10/2005 | Ku | H02K 33/16 29/596 |
| 2010/0019601 | A1 * | 1/2010 | Saban | H02K 3/28 310/156.28 |
| 2010/0019602 | A1 * | 1/2010 | Saban | H02K 3/28 310/156.28 |
| 2010/0295402 | A1 | 11/2010 | Miyashita et al. | |
| 2012/0049661 | A1 | 3/2012 | Ions et al. | |
| 2012/0049662 | A1 | 3/2012 | Ions | |
| 2014/0028139 | A1 * | 1/2014 | Hamer | H02K 1/2766 310/156.11 |
| 2014/0183777 | A1 * | 7/2014 | Ions | H02K 1/2733 264/101 |
| 2014/0184007 | A1 | 7/2014 | Ions et al. | |
| 2014/0300233 | A1 * | 10/2014 | Arimatsu | H02K 1/278 29/598 |
| 2016/0028282 | A1 * | 1/2016 | Geis | H02K 1/28 310/156.28 |
| 2016/0065018 | A1 | 3/2016 | Yoshida et al. | |
| 2017/0353069 | A1 | 12/2017 | Ions et al. | |
| 2018/0054100 | A1 | 2/2018 | Takashima et al. | |
| 2018/0102700 | A1 | 4/2018 | Yoshida et al. | |
| 2019/0006916 | A1 * | 1/2019 | Peterson | H02K 1/223 |
| 2019/0109502 | A1 * | 4/2019 | Takano | H02K 1/278 |
| 2019/0181707 | A1 * | 6/2019 | Takano | H02K 1/28 |
| 2020/0119606 | A1 * | 4/2020 | Murakami | H02K 21/145 |

FOREIGN PATENT DOCUMENTS

| | | |
|---|---|---|
| JP | S60147959 U | 10/1985 |
| JP | 2002152999 A | 5/2002 |
| JP | 2002354724 A | 12/2002 |
| JP | 2003111323 A | 4/2003 |
| JP | 3484051 B2 | 1/2004 |
| JP | 2013236541 A | 11/2013 |
| JP | 2016052218 A | 4/2016 |
| JP | 6072395 B1 | 2/2017 |
| WO | 2008047767 A1 | 4/2008 |

OTHER PUBLICATIONS

Office Action dated Sep. 1, 2020, issued in corresponding Japanese Patent Application No. 2019521992, 8 pages including 4 pages of English translation.
International Search Report (PCT/ISA/210) dated Jun. 26, 2018, by the Japan Patent Office as the International Searching Authority for International Application No. PCT/JP2018/014741.
Written Opinion (PCT/ISA/237) dated Jun. 26, 2018, by the Japan Patent Office as the International Searching Authority for International Application No. PCT/JP2018/014741.

* cited by examiner

ROTOR, ROTARY ELECTRIC MACHINE, AND METHOD FOR MANUFACTURING ROTOR

TECHNICAL FIELD

The present disclosure relates to a rotor of a rotary electric machine in which permanent magnets are provided to the rotor, a rotary electric machine, and a method for manufacturing a rotor.

BACKGROUND ART

In recent years, rotary electric machines for industrial purposes have been increasingly required to have high efficiency and high output and to be capable of high-speed rotation. As the rotary electric machines, there are two types, i.e., "synchronous type" and "induction type". For industrial purposes, synchronous rotary electric machines are being applied. In the synchronous rotary electric machines, permanent magnets are used for a magnetic field of a rotor. Therefore, in theory, heat generation does not occur, and thus there is an advantage in terms of high efficiency and high output. However, it is necessary to cope with peeling of permanent magnets due to a centrifugal force.

As a permanent magnet synchronous electric motor having a structure for suppressing peeling of permanent magnets as described above, disclosed is a permanent magnet synchronous electric motor including: a rotor member including a steel magnetic ring located on the inner circumferential side, a carbon fiber reinforced plastic (CFRP) layer located on the outer circumferential side, and a plurality of permanent magnets sandwiched between the magnetic ring and the CFRP layer; and a rotary shaft, wherein the rotor member is hydraulically fitted to the rotary shaft, and the magnetic ring keeps a tightening force to the rotary shaft even during high-speed rotation (see, for example, Patent Document 1).

CITATION LIST

Patent Document

Patent Document 1: Japanese Patent No. 3484051

SUMMARY OF THE INVENTION

Problems to be Solved by the Invention

However, in the technology disclosed in Patent Document 1, the outer circumference of a permanent magnet including a plurality of permanent magnet rings formed by sintering and arranged in series is directly wound with CFRP subjected to impregnation with adhesion resin, and then the resin is cured in a furnace, to integrally form the CFRP layer. Thereafter, turn-back portions at both ends of the CFRP layer and dummy pieces are removed and the CFRP layer is cut at a predetermined length. However, since a sintered magnet is easily cracked by working, it is difficult to cut the CFRP layer to a position flush with the permanent magnet end surface. Therefore, a space where there is no permanent magnet remains in the inner circumferential part at the end of the CFRP layer.

The rotor having such a space has a problem that the CFRP layer at the permanent magnet end surface might be broken due to stress concentration during high-speed rotation.

The present disclosure has been made to solve the above problem, and an object of the present disclosure is to provide a rotor, a rotary electric machine, and a rotor manufacturing method that enable prevention of damage on a protection cover due to a centrifugal force during rotation, and suppression of peeling of permanent magnets, thus improving reliability.

Solution to the Problems

A rotor according to one aspect of the present disclosure includes: a plurality of permanent magnets divided at regular intervals in a circumferential direction around a shaft, and provided in an axial direction; a first protection ring for positioning and holding ends in the axial direction of the permanent magnets; a second protection ring for positioning and holding other ends in the axial direction of the permanent magnets; and a protection cover covering outer circumferential surfaces of the permanent magnets, the first protection ring, and the second protection ring, and having a uniform thickness in a radial direction.

A rotary electric machine according to one aspect of the present disclosure includes: a stator; and the above rotor supported rotatably about an axis, on an inner side of the stator.

A method for manufacturing the above rotor according to one aspect of the present disclosure includes a pressure step of bringing the first protection ring, the permanent magnets, and the second protection ring into close contact with each other in the axial direction.

Effect of the Invention

In the rotor according to one aspect of the present disclosure, a space where there is no permanent magnet does not remain in the inner circumferential part at the end of the cover, so that there is no risk of the cover being broken by stress concentration, and thus a reliable rotor can be provided.

DESCRIPTION OF EMBODIMENTS

Embodiment 1

Hereinafter, a rotor and a method for manufacturing the rotor according to embodiment 1 will be described with reference to the drawings.

Figure 1:
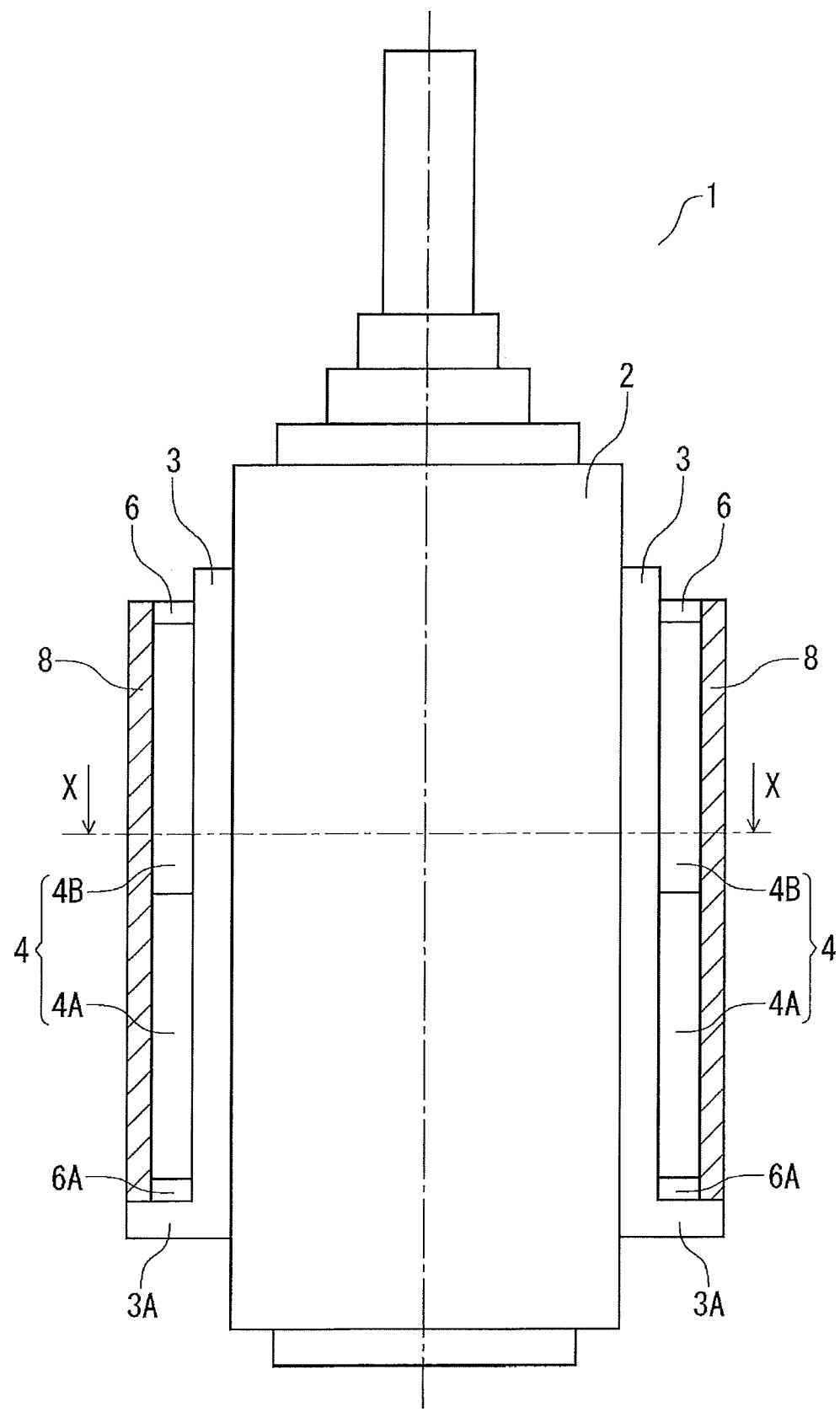
FIG. 1 is a vertical sectional view of a rotor according to embodiment 1.

FIG. 1 is a vertical sectional view of a rotor 1 according to embodiment 1.

Figure 2:
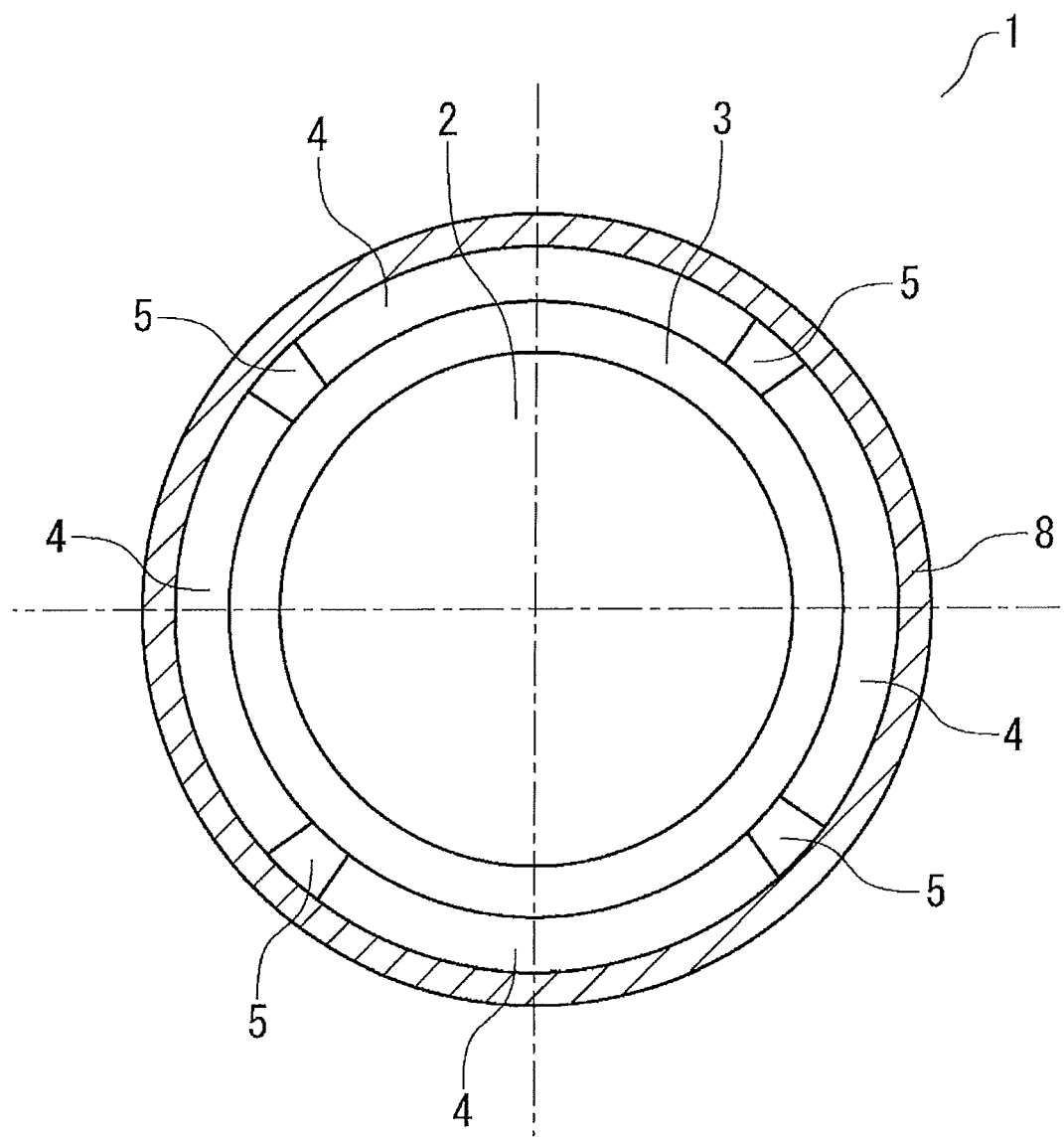
FIG. 2 is a transverse sectional view along line X-X in FIG. 1, according to embodiment 1.

FIG. 2 is a transverse sectional view along line X-X in FIG. 1.

As shown in FIG. 1 and FIG. 2, the rotor 1 includes: a cylindrical core 3 provided to a shaft 2 and having, at one end of the core 3, a flange 3A protruding in the radial direction; and a plurality of permanent magnets 4 arranged on the outer circumferential surface of the core 3, i.e., divided in the circumferential direction so as to form N and S poles alternately at regular intervals with spacers 5 therebetween, and provided in the axial direction. The permanent magnets 4 are also divided into two parts in the axial direction, and are composed of four lower permanent magnets 4A provided on the lower side in the drawing of FIG. 1 and four upper permanent magnets 4B provided on the upper side, i.e., eight permanent magnets in total. The spacers 5 may also be divided into two parts in the axial direction as in the permanent magnets 4. The sectional shape of each permanent magnet 4 shown in FIG. 2 is an arc shape, and the sectional shape of each spacer 5 is a rectangular shape. The spacer 5 has the same length in the axial direction as the permanent magnet 4, and fills the gap between the adjacent permanent magnets 4. It is noted that a function as the rotor 1 is obtained even with a configuration in which no spacers 5 are provided and the permanent magnets 4 are arranged in a divided manner without gaps in the circumferential direction.

A first protection ring 6A is provided between the flange 3A formed at one end of the core 3, and the permanent magnets 4 provided on the core 3. A second protection ring 6 is provided at upper ends in the axial direction of the permanent magnets 4 so as to be opposed to the first protection ring 6A. The first protection ring 6A and the second protection ring 6 have a function of positioning and holding the ends in the axial direction of the permanent magnets 4.

The first protection ring 6A, the second protection ring 6, and the permanent magnets 4 are all in contact with the outer circumferential surface of the same core 3. A protection cover 8 is provided around the outer circumferences of the first protection ring 6A, the second protection ring 6, and the permanent magnets 4. As shown in FIG. 1 and FIG. 2, the protection cover 8 covers the outer circumferential surfaces of the first protection ring 6A, the second protection ring 6, the permanent magnets 4, and the spacers 5. The protection cover 8 has a uniform thickness in the radial direction.

Next, materials used for the above constituent members will be described. The core 3 is a magnetic body, and is formed by stacking annular thin sheets stamped from electromagnetic steel sheets, for example. Alternatively, a steel pipe or a dust core may be used. The permanent magnet 4 is a rare earth magnet, or may be a ferrite magnet. The spacer 5 is made of nonmagnetic stainless steel, or may be an aluminum alloy, a copper alloy, or a resin. For the first protection ring 6A and the second protection ring 6, nonmagnetic stainless steel is used. Alternatively, an aluminum alloy, a copper alloy, titanium, a titanium alloy, or a resin may be used. For the purpose of avoiding stress concentration on the protection cover 8 due to a centrifugal force during rotation of the rotor 1, it is desirable that the density of the permanent magnet 4 and the density of the first protection ring 6A and the second protection ring 6 are close to each other so that the centrifugal force is applied further equally on the inner circumferential surface of the protection cover 8. For example, in the case where the permanent magnet 4 is a neodymium magnet (density: 7.3 to 7.5 g/cm3), the first protection ring 6A and the second protection ring 6 are made of stainless steel (density: 7.75 to 7.98 g/cm3), as a suitable combination.

The protection cover 8 is formed by directly winding a fiber bundle of carbon fiber reinforced plastic (CFRP). Instead of CFRP, a fiber bundle of glass fiber reinforced plastic (GFRP) may be used. Instead of the fiber bundle, tape-shaped CFRP or GFRP may be used.

Next, a method for manufacturing the rotor will be described with reference to FIG. 1, FIG. 3, and FIG. 4.

Figure 3:
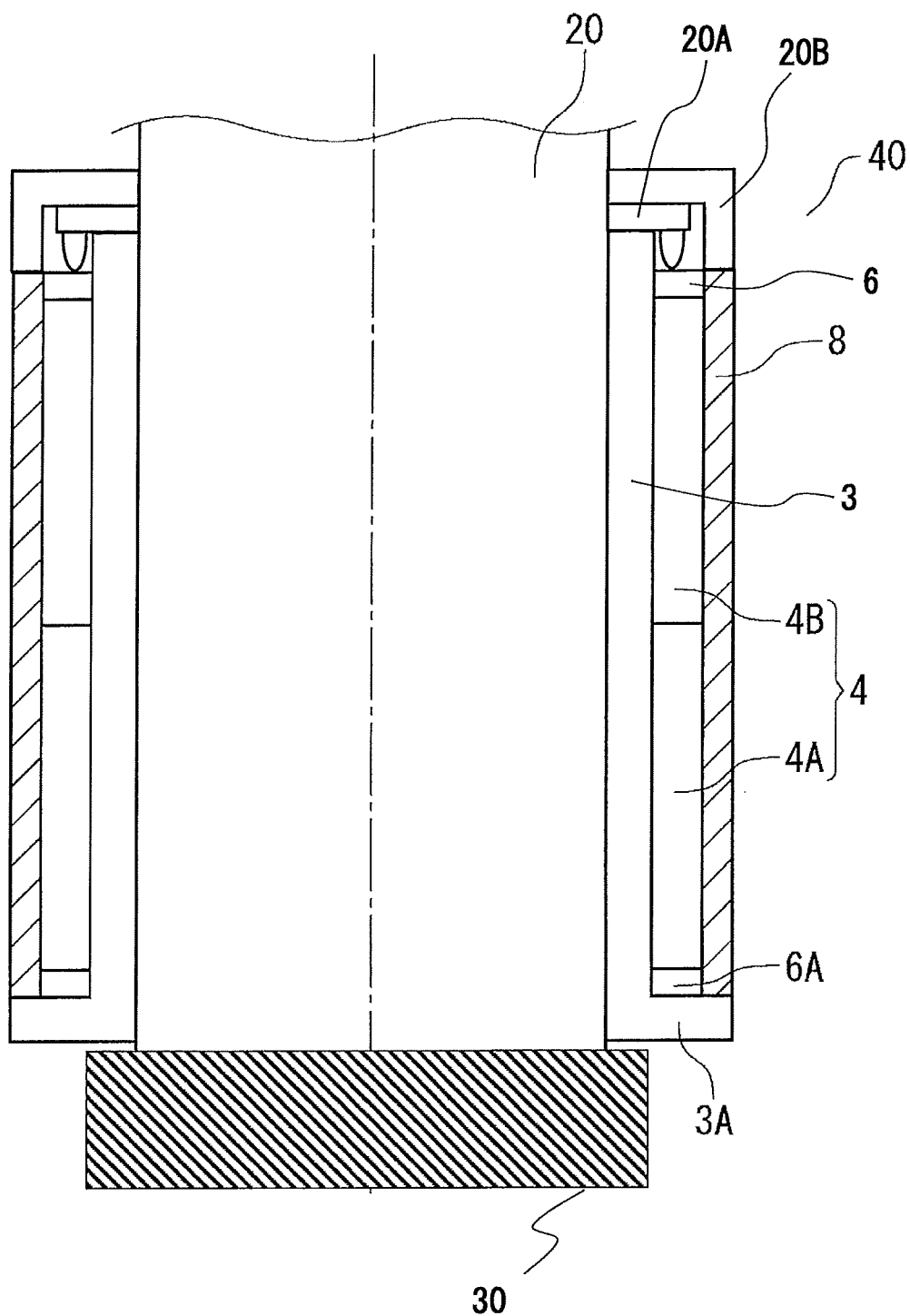
FIG. 3 is a schematic sectional view showing a magnet assembly assembled using a core provisionally disposed on a dedicated jig.

FIG. 3 is a schematic sectional view showing a magnet assembly 40 assembled using the core 3 provisionally disposed on a dedicated jig 20.

Figure 4:
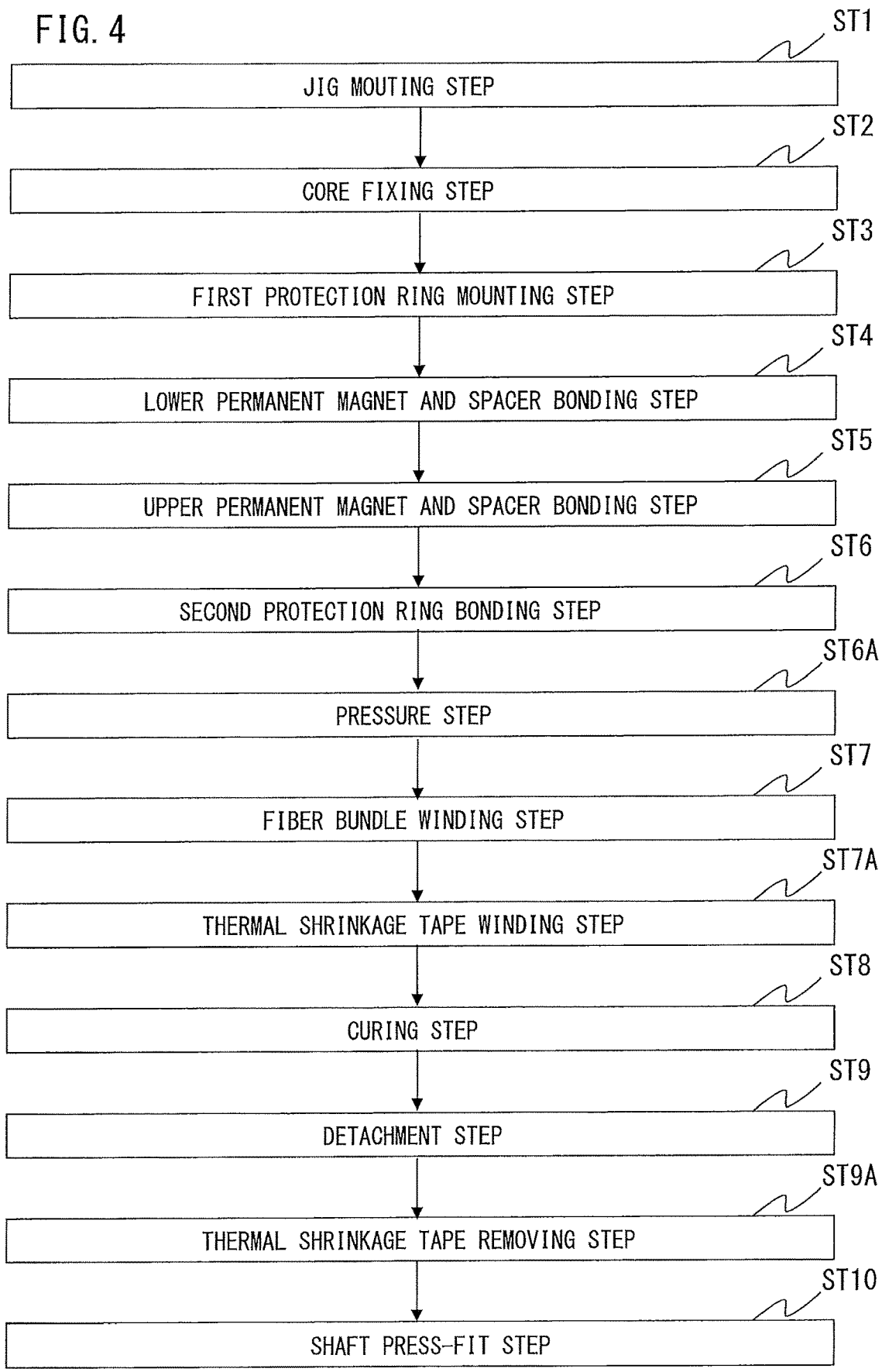
FIG. 4 is a flowchart for assembling the rotor according to embodiment 1.

FIG. 4 is a flowchart for assembling the rotor 1 including the magnet assembly 40.

Here, the magnet assembly 40 is obtained by integrally forming the first protection ring 6A, the second protection ring 6, the permanent magnets 4, the spacers 5, and the protection cover 8 on the outer circumferential surface of the core 3. Hereinafter, the manufacturing method will be described for each step (abbreviated as ST).

ST1: A dedicated jig 20 is mounted on a rotational driving device 30 (jig mounting step).

ST2: The core 3 is fixed to the dedicated jig 20 by a fixture (not shown) (core fixing step).

ST3: The first protection ring 6A is mounted in contact with the flange 3A of the core 3 (first protection ring mounting step).

ST4: The plurality of lower permanent magnets 4A and the spacers 5 are bonded to the outer circumferential surface of the core 3 by an adhesive agent such that their lower ends are in contact with the first protection ring 6A (lower permanent magnet and spacer bonding step). At this time, the lower permanent magnets 4A are provided such that N and S poles are alternately arranged in the circumferential direction with the spacers 5 therebetween.

ST5: In the same manner as in ST4, a plurality of upper permanent magnets 4B and spacers 5 are bonded to the outer circumferential surface of the core 3 by an adhesive agent (upper permanent magnet and spacer bonding step).

ST6: The second protection ring 6 is bonded to the outer circumferential surface of the core 3 by an adhesive agent so as to be in contact with the axial-direction end surfaces of the upper permanent magnets 4B (second protection ring bonding step).

ST6A: A pressure jig 20A for pressing the second protection ring 6 in the axial direction is mounted on the upper side in the axial direction of the second protection ring 6, and presses the second protection ring 6 in the axial direction before the adhesive agent is cured (pressure step). Thus, the first protection ring 6A, the permanent magnets 4, and the second protection ring 6 are fixed in close contact with each other with no gaps in the axial direction.

ST7: The rotational driving device 30 is operated to rotationally drive the dedicated jig 20, thereby winding a fiber bundle of glass fibers or carbon fibers helically in the axial direction (filament winding), while the fiber bundle is being impregnated with epoxy resin for adhesion, so that the fiber bundle is uniformly wound around the outer circumferential surfaces of the first protection ring 6A, the permanent magnets 4, the spacers 5, and the second protection ring 6 (fiber bundle winding step). The winding may be performed downward from the upper side in the drawing of FIG. 3, or may be performed upward from the lower side. Instead of performing the winding while impregnating the fiber bundle with resin, a tape-shaped fiber material impregnated with resin in advance may be used. At this time, the range in which the fiber bundle is wound is restricted from both sides in the axial direction by an end restricting jig 20B. Thus, the resin with which the fiber material is impregnated is prevented from spreading in the axial direction.

ST7A: A heat shrinkable tape (not shown) which shrinks by heat is wound around the outer circumference of the wound fiber bundle of CFRP (heat shrinkable tape winding step). The heat shrinkable tape prevents sagging of the resin in the circumferential direction. Thus, the protection cover 8 having a uniform thickness can be obtained.

ST8: The epoxy resin is cured in a furnace (curing step).

ST9: The magnet assembly 40 integrally fixed is detached from the dedicated jig 20 (detachment step).

ST9A: The heat shrinkable tape is removed from the outer circumference of the magnet assembly 40 (heat shrinkable tape removing step).

ST10: The shaft 2 is fitted and fixed to the magnet assembly 40 by press-fit, whereby the rotor 1 shown in FIG. 1 is manufactured (shaft press-fit step).

Here, epoxy resin is used in view of strength and rigidity. Other than this, vinyl ester resin, unsaturated polyester resin, polyurethane resin, phenol resin, or acrylic resin may be used, which provides excellent properties.

As described in ST10 above, in the present embodiment, since the shaft 2 is press-fitted to the inner side of the magnet assembly 40, the core 3 is expanded outward in the radial direction from the inner circumferential surface of the core 3, and this gives an interference for joining the core 3 and the protection cover 8, whereby joining between the magnet assembly 40 and the shaft 2 can be further strengthened.

In the above core 3, the flange 3A is formed at one end (lower end in the drawing). However, a core not having the flange 3A may be used.

Figure 5:
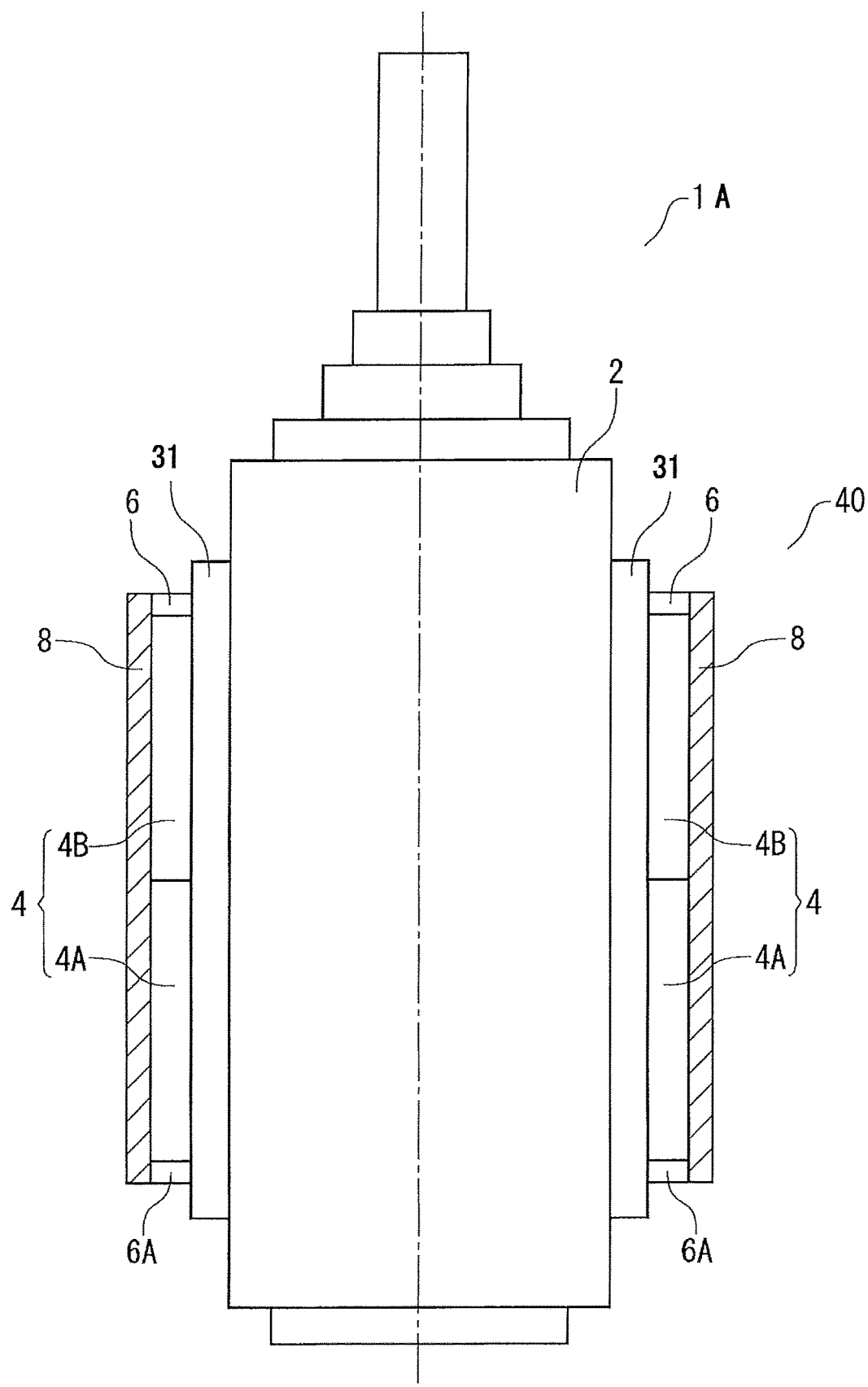
FIG. 5 is a vertical sectional view showing another example of a rotor according to embodiment 1.

FIG. 5 is a vertical sectional view of a rotor 1A provided with a core 31 instead of the core 3.

Figure 6:
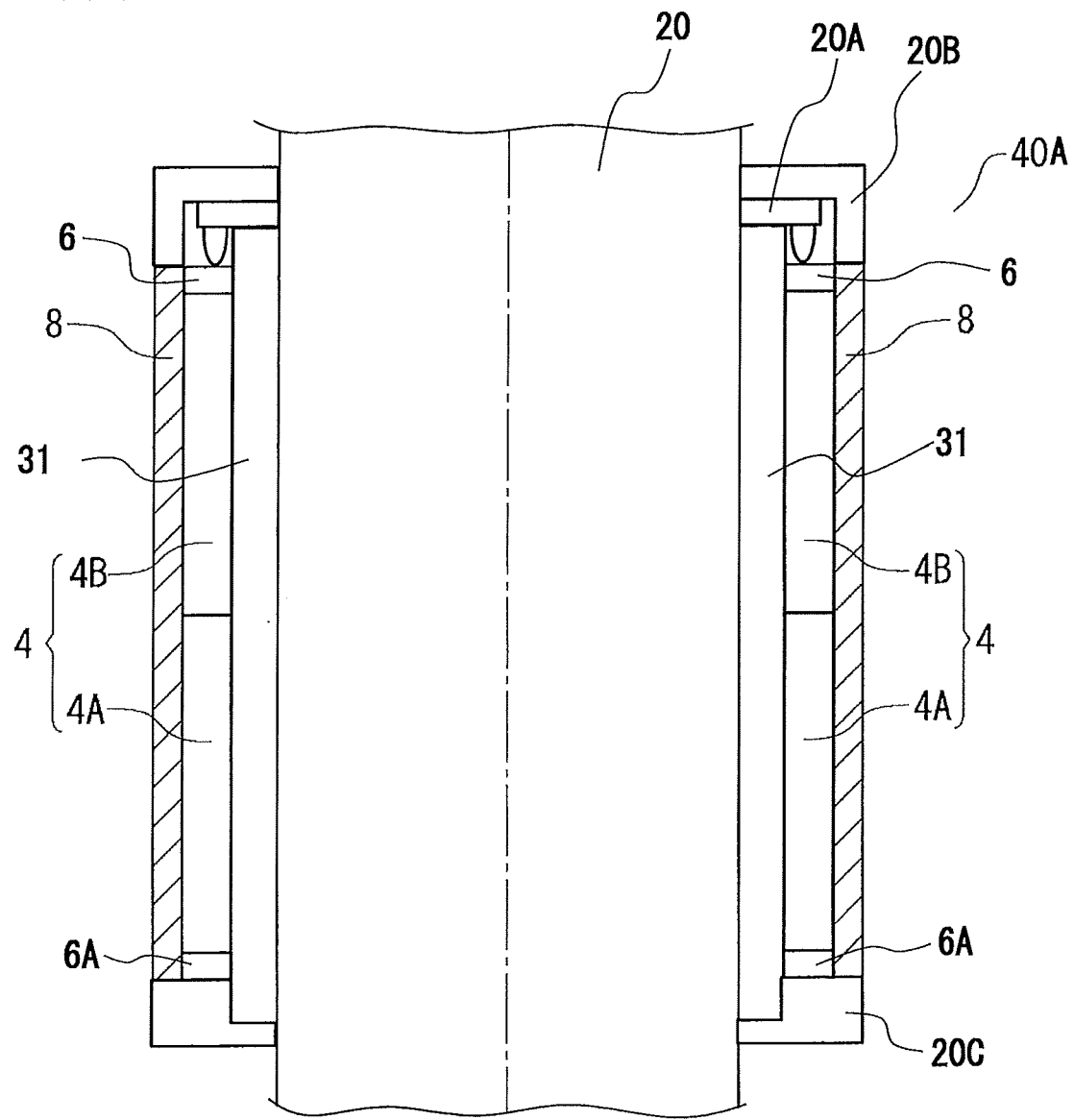
FIG. 6 is a schematic sectional view showing a magnet assembly assembled using a core provisionally disposed on a dedicated jig.

FIG. 6 is a schematic sectional view showing a magnet assembly 40A assembled using the core 31 provisionally disposed on the dedicated jig 20.

Employing the structure of the core 31 not having a flange as shown in the drawings can simplify manufacturing of the core 31, leading to cost reduction. In the manufacturing method for the rotor 1A, the above ST3 is replaced with the following ST3A.

ST3A: The first protection ring 6A is fixed on the core 31 by an adhesive agent. In this case, as shown in FIG. 6, the first protection ring 6A is positioned in the axial direction by an end holding jig 20C, and the second protection ring 6 is pressed in the axial direction by the pressure jig 20A, whereby the first protection ring 6A, the permanent magnets 4, and the second protection ring 6 are brought into close contact with each other with no gaps in the axial direction.

In the above description, an example in which one first protection ring 6A and one second protection ring 6 are provided has been shown. However, in the case where the length in the axial direction of the core depending on the size of the rotor is great as compared to the length in the axial direction of the permanent magnets 4, a plurality of first protection rings 6A and a plurality of second protection rings 6 may be provided. In addition, instead of dividing the permanent magnets 4 in the axial direction into two parts as the lower permanent magnets 4A and the upper permanent magnets 4B, the permanent magnets 4 may be divided into more than two parts, e.g., three parts, or may not be divided.

Figure 7:
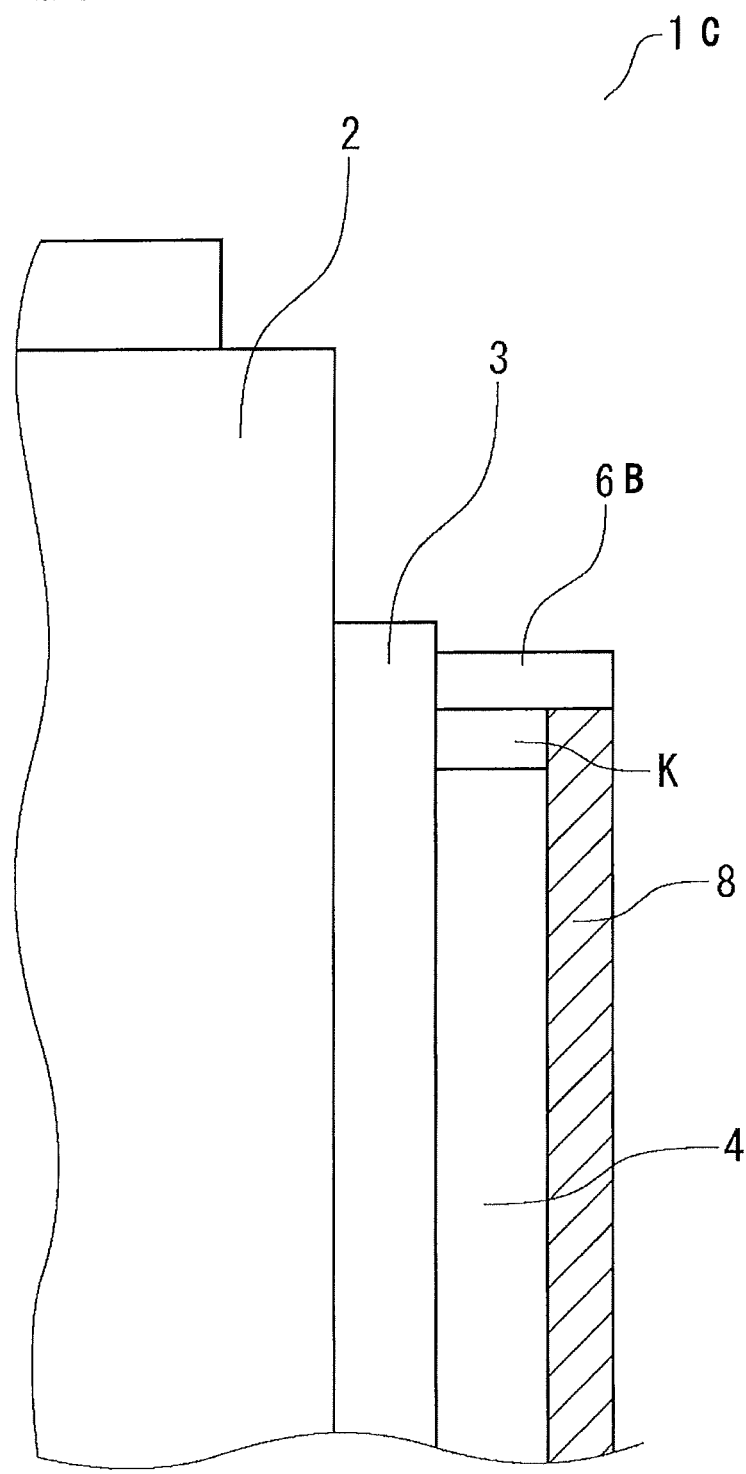
FIG. 7 is a vertical sectional view of a major part of a rotor as a comparative example.

FIG. 7 is a vertical sectional view of a major part of a rotor 1C as a comparative example in which there is a space K between a protection ring 6B and the permanent magnets 4.

In the case where the rotary electric machine including the rotor 1 according to embodiment 1 operates at a rated rotation speed of, for example, 20000 RPM, centrifugal forces occurring on the first protection ring 6A, the second protection ring 6, the permanent magnets 4, and the spacers 5 are applied to the protection cover 8. However, the rotor 1 has a structure in which the space K shown in FIG. 7 which causes a problem is not formed. Therefore, concentrating stress is not applied to the protection cover 8.

The rotor and the method for manufacturing the rotor according to embodiment 1 can prevent a shearing force due to a centrifugal force from acting on the protection cover 8. This provides effects of preventing occurrence of damage on the protection cover 8 and enabling the permanent magnets 4 to be reliably held.

Embodiment 2

Hereinafter, a rotor and a method for manufacturing the rotor according to embodiment 2 will be described with reference to the drawings.

In embodiment 1, the example in which the magnet assembly 40 is assembled using the dedicated jig 20 has been shown. In contrast, in the present embodiment 2, the rotor 1 is manufactured by a manufacturing method shown in the following process. That is, without using the dedicated jig 20, the shaft 2 is initially press-fitted into the core 3, and then the magnet assembly 40 is assembled, whereby the rotor 1 shown in FIG. 1 is manufactured.

Figure 8:
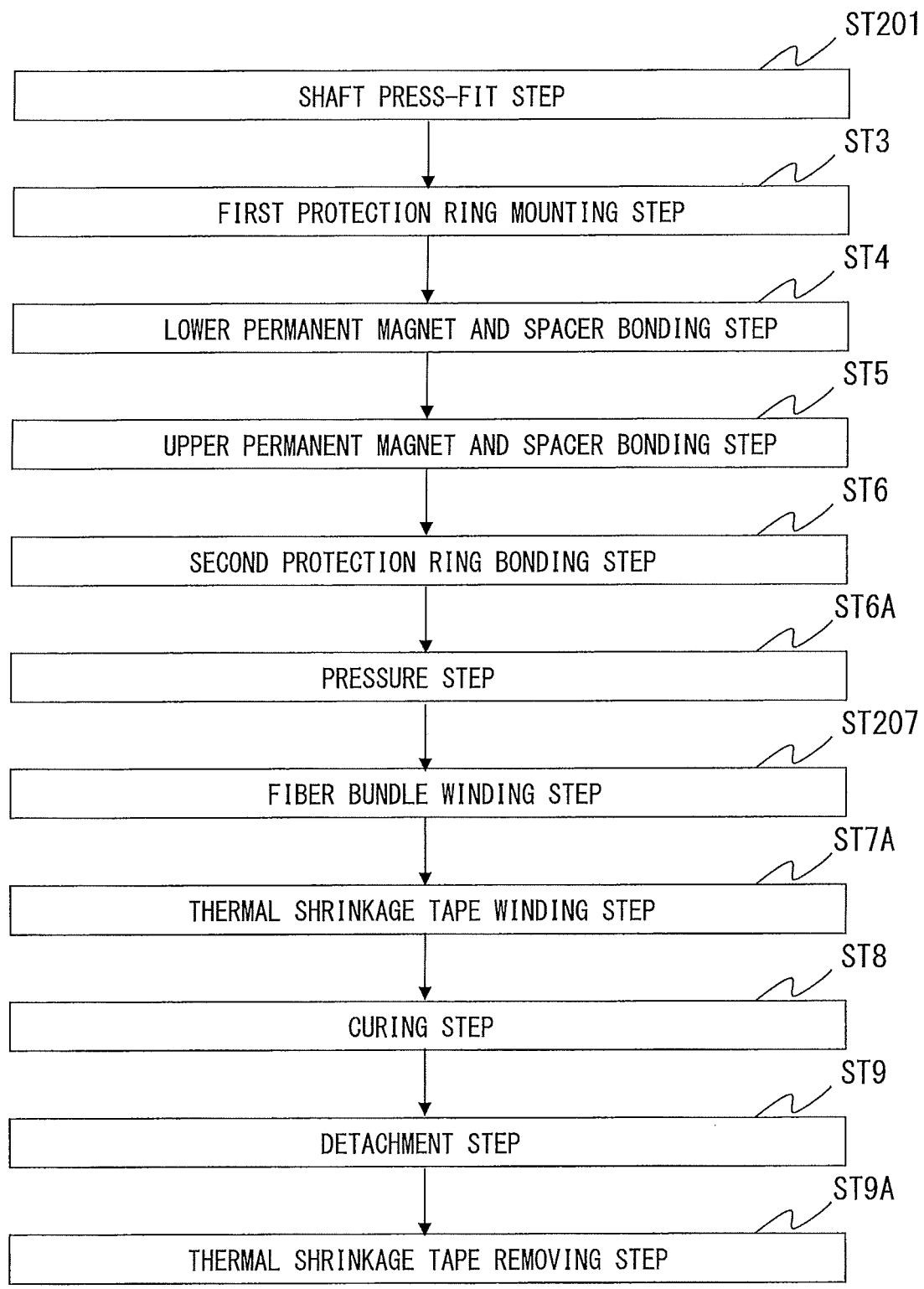
FIG. 8 is a flowchart for assembling a rotor according to embodiment 2.

FIG. 8 is a flowchart for assembling the rotor 1 according to embodiment 2.

Hereinafter, each step of the manufacturing method will be described.

ST201: The shaft 2 is press-fitted to the core 3 (shaft press-fit step).

ST3 to ST6A: The same operations as in ST3 to ST6A of embodiment 1 are performed.

ST207: The rotational driving device 30 is connected to the shaft 2 and rotationally drives the shaft 2, thereby winding a fiber bundle of CFRP helically in the axial direction (filament winding), while the fiber bundle is being impregnated with epoxy resin for adhesion, so that the fiber bundle is uniformly wound around the outer circumferential surfaces of the first protection ring 6A, the permanent magnets 4, the spacers 5, and the second protection ring 6 (fiber bundle winding step).

ST7A to ST9A: The same operations as in embodiment 1 are performed.

In the present embodiment, ST10 in embodiment 1 is not needed. Through the above process, the rotor 1 shown in FIG. 1 is manufactured. The manufactured rotor is the same as the rotor 1 in embodiment 1. Therefore, concentrating stress is not applied to the protection cover 8, and thus an effect of preventing occurrence of damage on the protection cover 8 is provided.

Embodiment 3

Hereinafter, a rotor and a method for manufacturing the rotor according to embodiment 3 will be described with reference to the drawings.

Figure 9:
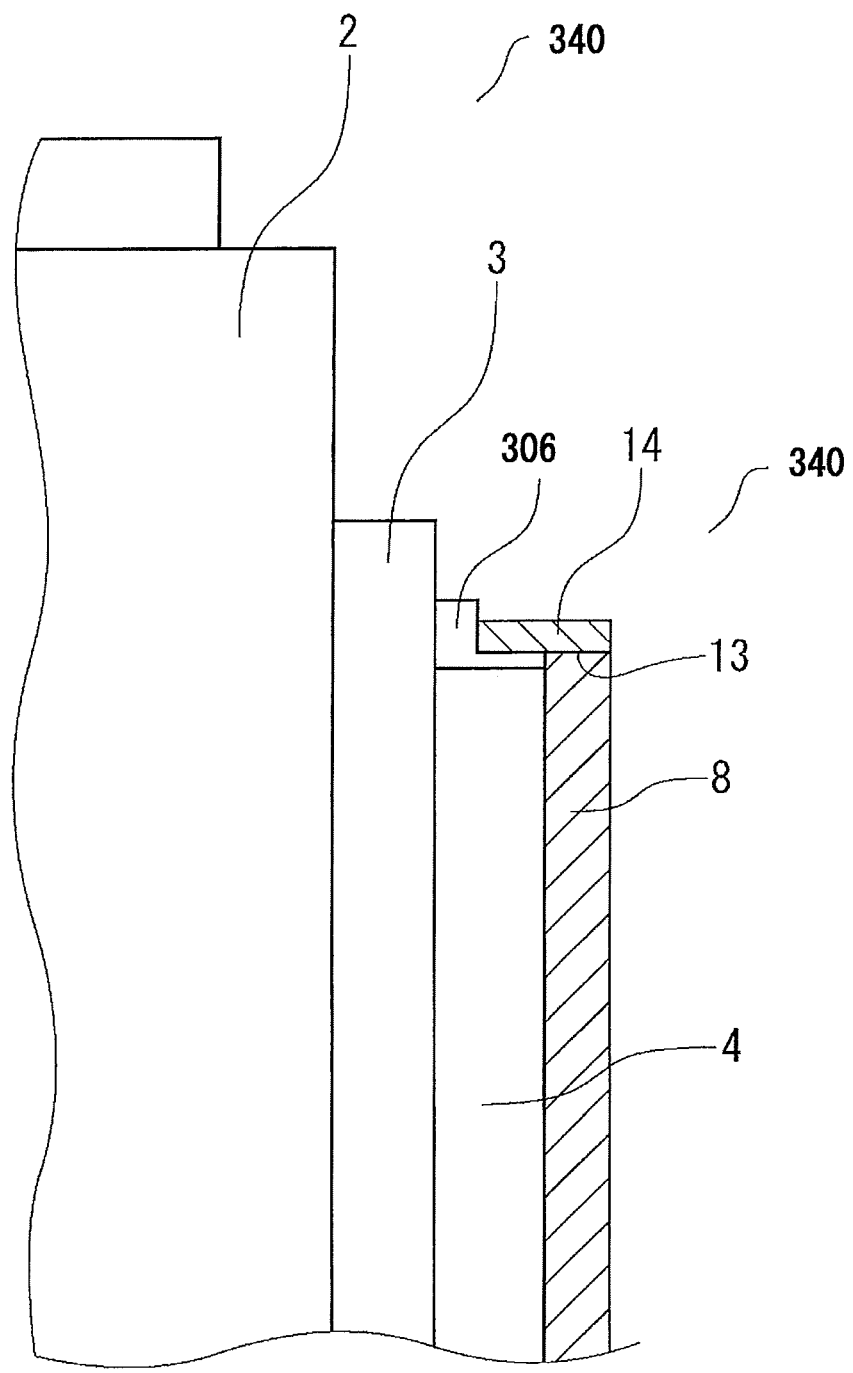
FIG. 9 is a vertical sectional view of a major part of a rotor according to embodiment 3.

FIG. 9 is a vertical sectional view of a major part of a rotor 301.

Figure 10:
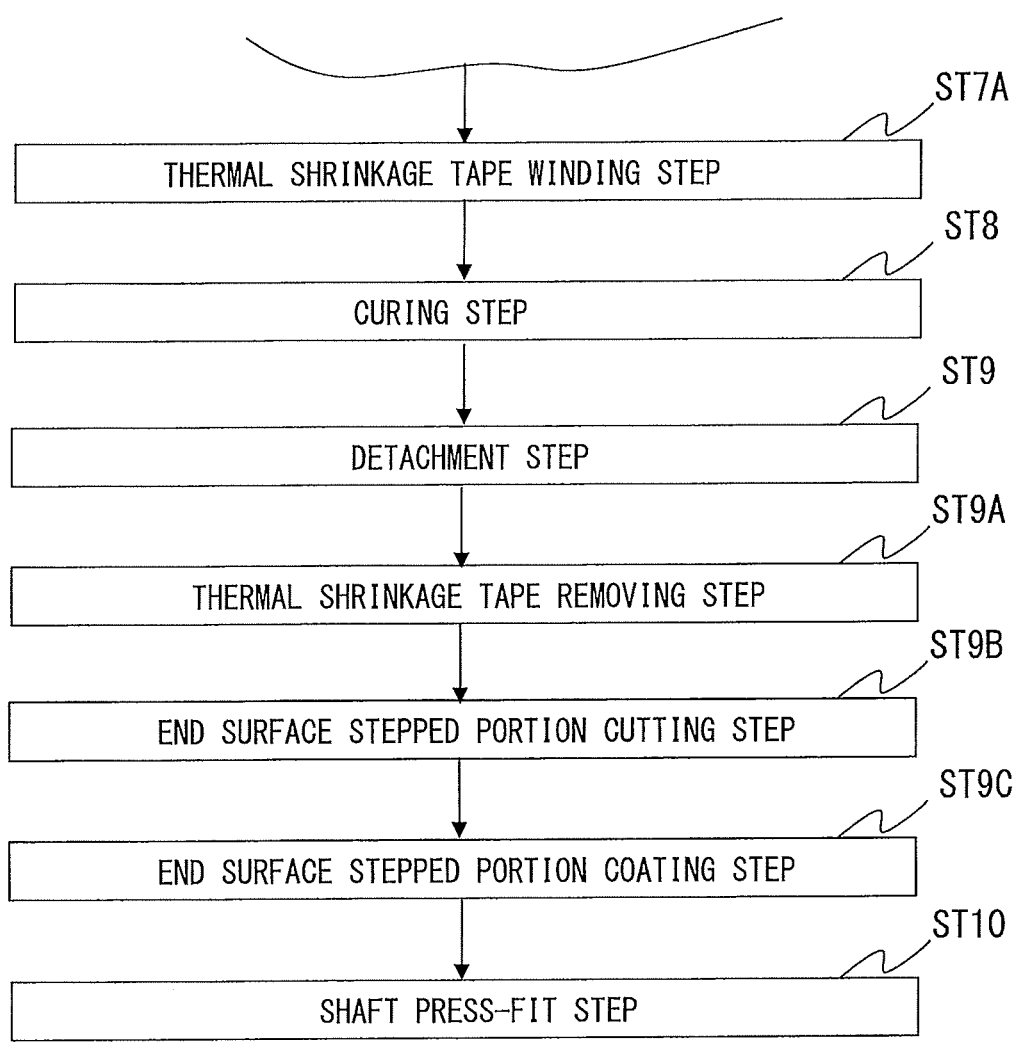
FIG. 10 is a flowchart for assembling a rotor according to embodiment 3.

FIG. 10 is a flowchart for assembling the rotor 301.

In the method for manufacturing the rotor according to the present embodiment 3, after ST9A in the manufacturing method described in embodiment 1, ST9B and ST9C shown in FIG. 10 and described below are added, to manufacture a magnet assembly 340.

ST9B: An end surface stepped portion 13 annularly recessed in the axial direction on the outer circumferential side is formed on the second protection ring 306 and the protection cover 8 by cutting work using a machine (end surface stepped portion cutting step).

ST9C: Epoxy resin is applied to the end surface stepped portion 13 and cured, to form a coating 14 (end surface stepped portion coating step).

The reason why ST9B and ST9C are added as described above will be described below.

Figure 11:
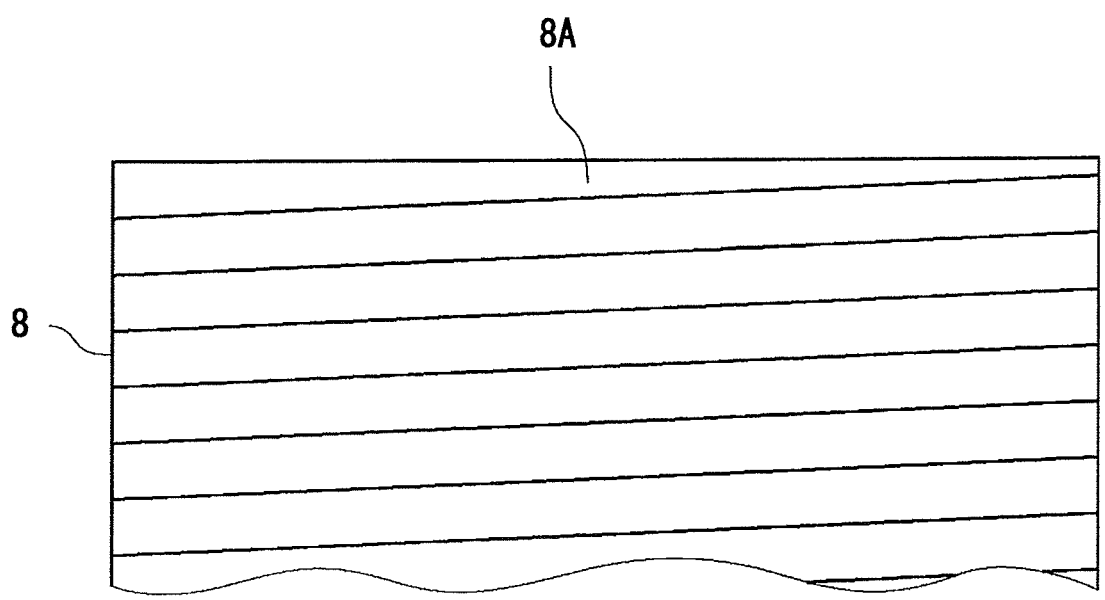
FIG. 11 is a schematic side view of a protection cover according to embodiment 3.

FIG. 11 is a schematic side view of the protection cover 8.

The protection cover 8 is formed by so-called filament winding in which a fiber bundle 8A of CFRP is helically wound in the axial direction as shown in FIG. 11. The cutting work for the end surface stepped portion 13 and the coating treatment therefor are performed on the side where winding of the CFRP is finished (the CFRP is wound upward from the lower side in the drawing of FIG. 11). Thus, the cutting work for the protection cover 8 is performed for removing the winding finish end of the CFRP on the outermost layer surface of the protection cover 8. The state in which the winding finish end is removed is shown in FIG. 11. It is noted that, as shown in FIG. 9, the end surface of the second protection ring 306 is also cut at the same time by the mechanical work as described above. Providing the end surface stepped portion 13 as described above eliminates the possibility that the CFRP fibers at the winding finish end on the outermost layer surface of the CFRP might be untied. In addition, an effect of the coating 14 preventing fluff of the CFRP fibers from scattering is provided. It is noted that the winding finish end may be on either side in the axial direction.

Embodiment 4

Hereinafter, a rotor and a method for manufacturing the rotor according to embodiment 4 will be described with reference to the drawings.

Figure 12:
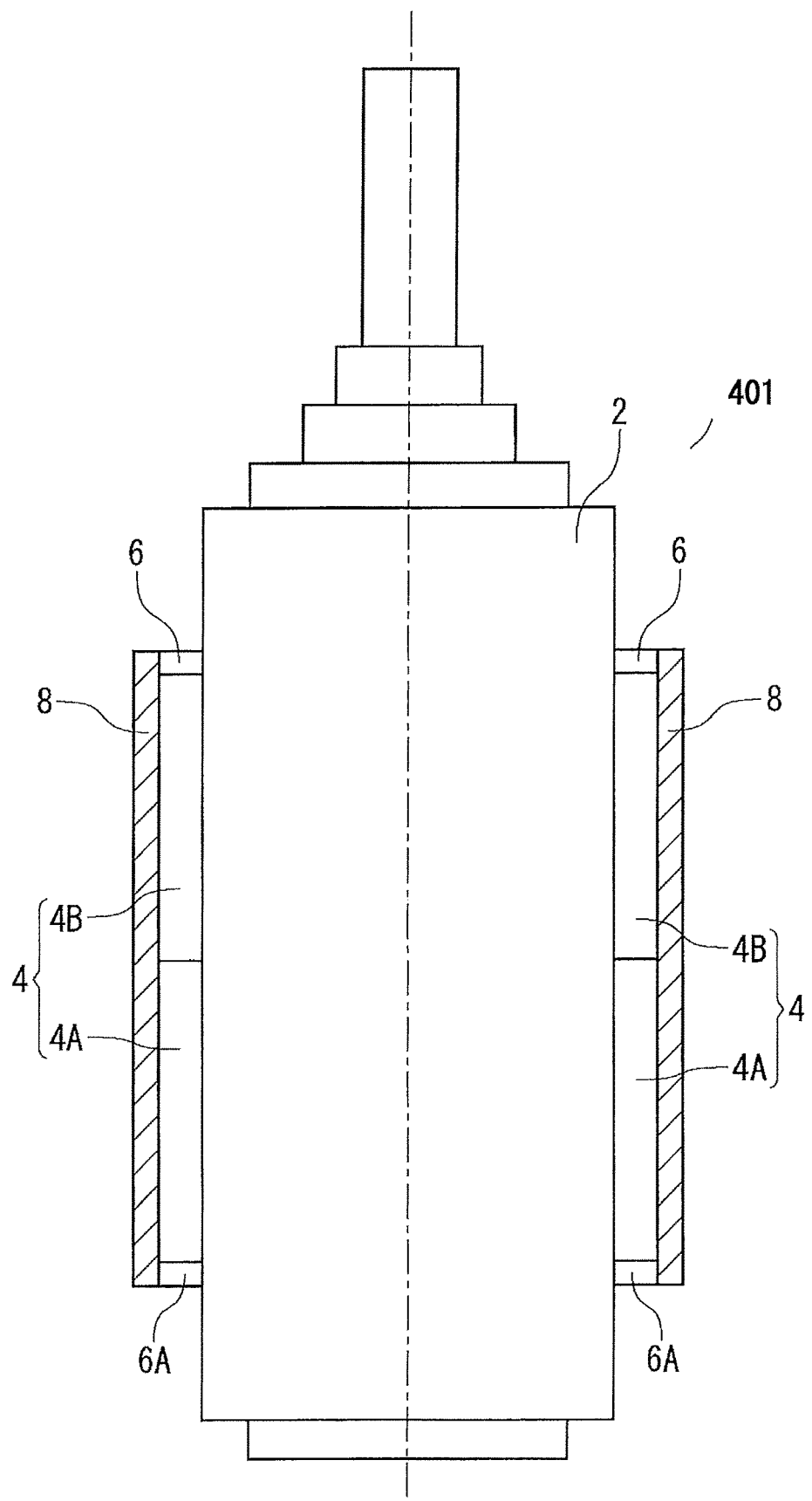
FIG. 12 is a vertical sectional view of a rotor according to embodiment 4.

FIG. 12 is a vertical sectional view of a rotor 401 according to embodiment 4.

Figure 13:
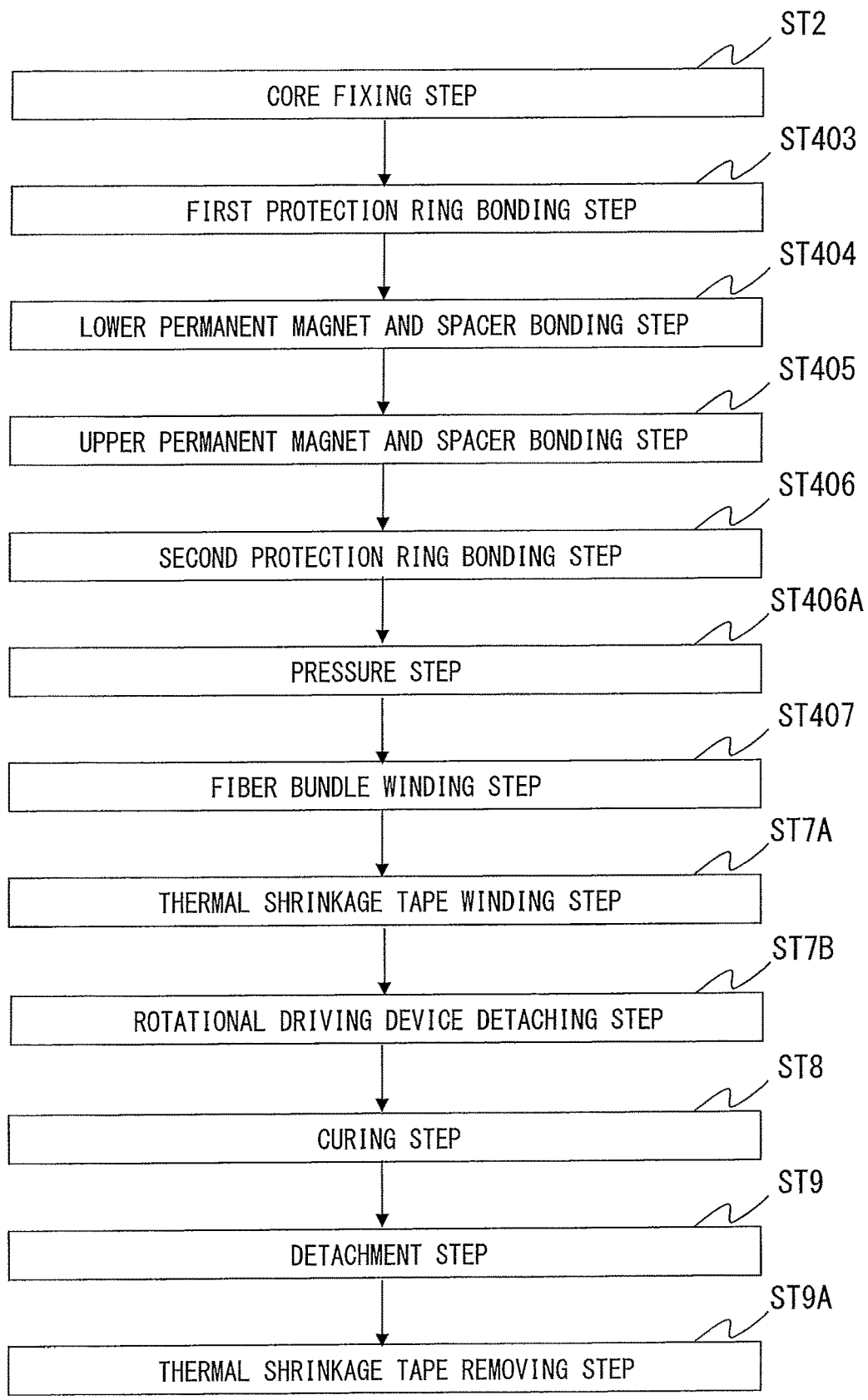
FIG. 13 is a flowchart for assembling the rotor according to embodiment 4.

FIG. 13 is a flowchart for assembling the rotor 401.

Rotary electric machines have ratings according to intended purposes. In the above embodiments 1 to 3, the configurations adapted to the rotor 1 of 20000 RPM class have been described. That is, in the above configurations, the shaft 2 is press-fitted and fixed to the core 3, and by the remaining tightening force, stress applied to the protection cover 8 due to a centrifugal force from the permanent magnets 4 is reduced. In contrast, in the present embodiment 4, the rotor 401 having the permanent magnets 4 directly bonded on the shaft 2 without providing the core 3 will be described. The other configurations are the same as those in embodiment 1.

Next, each step in the manufacturing method for the rotor 401 will be described.

Since the core 3 is not provided, ST1 and ST2 in embodiment 1 are not performed.

ST403: The first protection ring 6A is bonded to the outer circumferential surface of the shaft 2 by an adhesive agent (first protection ring bonding step).

ST404: The plurality of lower permanent magnets 4A and the spacers 5 are bonded to the outer circumferential surface of the shaft 2 by an adhesive agent (lower permanent magnet and spacer bonding step). At this time, the lower permanent magnets 4A are provided with the spacers 5 therebetween such that N and S poles are alternately arranged in the circumferential direction.

ST405: As in ST404, the upper permanent magnets 4B and the spacers 5 are bonded to the outer circumferential surface of the shaft 2 by an adhesive agent (upper permanent magnet and spacer bonding step).

ST406: The second protection ring 6 is bonded to the outer circumferential surface of the shaft 2 by an adhesive agent so as to be in contact with the axial-direction end surfaces of the upper permanent magnets 4B (second protection ring bonding step).

ST406A: The pressure jig 20A and the end holding jig 20C are attached to the shaft 2, and the second protection ring 6 is pressed in the axial direction before the adhesive agent is cured (pressure step).

ST407: The rotational driving device 30 is connected to the shaft 2 and rotationally drives the shaft 2, thereby winding the fiber bundle of CFRP around the outer circumferential surfaces of the first protection ring 6A, the permanent magnets 4, the spacers 5, and the second protection ring 6 in a traversing manner in the axial direction while the fiber bundle is being impregnated with epoxy resin for adhesion (fiber bundle winding step).

ST7A: A heat shrinkable tape is wound around the outer circumference of the wound fiber bundle of CFRP (heat shrinkable tape winding step).

ST7B: The rotational driving device is detached (rotational driving device detaching step).

ST8: The epoxy resin is cured in a furnace (curing step).

The subsequent steps are the same as those in embodiment 1.

In the rotor and the method for manufacturing the rotor according to embodiment 4, the number of components of the rotor 401 is small, and the manufacturing method therefor is simplified. Therefore, it is possible to provide the rotor 401 according to the intended purpose, at low cost.

Embodiment 5

Hereinafter, a rotary electric machine 100 according to embodiment 5 will be described with reference to the drawings.

Figure 14:
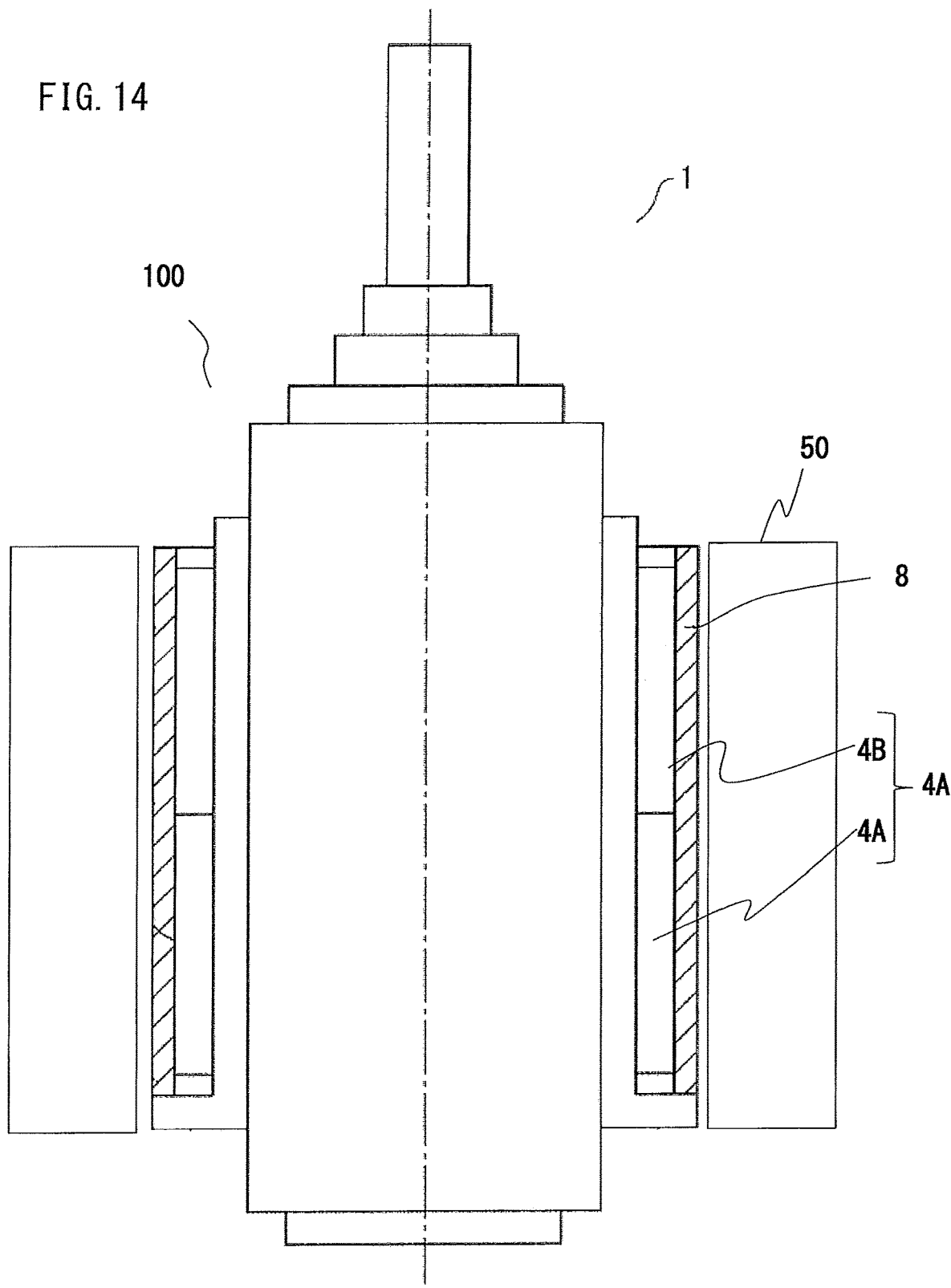
FIG. 14 is a vertical sectional view of a rotary electric machine according to embodiment 5.

FIG. 14 is a vertical sectional view of the rotary electric machine 100 including the rotor 1.

As shown in FIG. 14, in the rotary electric machine 100, the rotor 1 shown in FIG. 1 and FIG. 2 is supported rotatably about the axis by a bearing (not shown) on the inner side of a stator 50.

The rotary electric machine 100 is a highly reliable rotary electric machine that can withstand high-speed rotation, e.g., 20000 RPM, prevents radial-direction deformation or damage at ends of the protection cover 8, and has a simple reinforcing structure for preventing peeling of the permanent magnets 4. In addition, since no space remains on the radially inner side at an end in the axial direction of the protection cover 8 and deformation in the radial direction is prevented, the magnetic gap between the stator 50 and the rotor 1 can be set to be even smaller as compared to a general gap of 1 mm or smaller, thus providing an effect that high output and high efficiency of the rotary electric machine 100 can be achieved.

It is noted that, if the above magnetic gap is extremely small, an influence of cogging torque arises. Therefore, a preferable range of the magnetic gap is about 0.3 mm to 0.6 mm. Further, a rotary electric machine including the rotor 401 according to embodiment 4 is adapted to a rating of low rotation speed as compared to the rotor 1 according to embodiments 1 to 3, and therefore has an effect that a rotary electric machine with high cost performance can be provided.

Embodiment 6

Hereinafter, a rotor according to embodiment 5 will be described with reference to the drawings.

Figure 15:
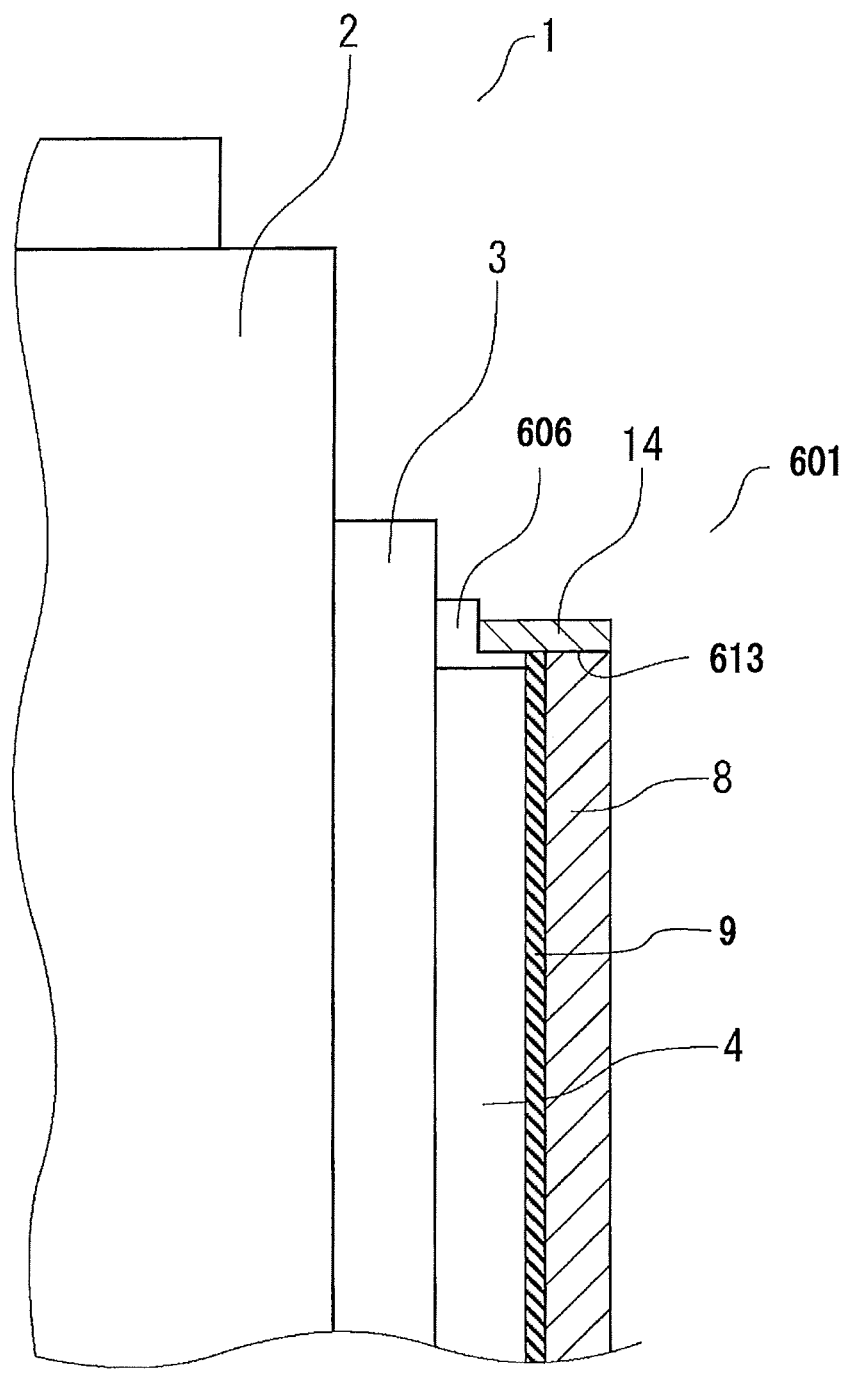
FIG. 15 is a vertical sectional view of a major part of a rotor according to embodiment 6.

FIG. 15 is a vertical sectional view of a major part of a rotor 601.

The rotor 601 includes a thin plate member 9 formed in a cylindrical shape between the inner circumferential surface of the protection cover 8 of the rotor 1 described in embodiments 1 to 3 and the outer circumferential surfaces of the first protection ring (not shown), the permanent magnets 4, the spacers 5, and a second protection ring 606, such that the thin plate member 9 is in contact with these components.

The other configurations are the same as those in embodiments 1 to 3, and therefore the description thereof is omitted. The thin plate member 9 is a nonmagnetic member and is made from a material such as copper, stainless steel, or aluminum, but is not limited to these materials.

As in embodiment 3, end surface stepped portions 613 are formed on the first protection ring, the second protection ring 606, the protection cover 8, and the thin plate member 9 by cutting work using a machine tool. The reason why the thin plate member 9 is additionally provided at the above part will be described below. At the corners of the boundary surfaces of the components such as the permanent magnets 4, the spacers 5, and the second protection ring 606, round portions or slight stepped portions might be formed or irregularities due to dimension error in manufacturing variations of the components might be formed.

Such stepped portions or irregularities can contribute to concentrated application of stress to the protection cover 8. In addition, if such stepped portions or irregularities are formed at the above parts, the stepped portions or irregularities are transferred to the materials at the time of winding the CFRP or GFRP, whereby wrinkles are formed on the surface of the completed protection cover 8, and thus the strength of the protection cover 8 might be deteriorated.

Considering the above, the thin plate member 9 is additionally provided between the inner circumferential surface of the protection cover 8 and the outer circumferential surfaces of the first protection ring, the permanent magnets 4, the spacers 5, and the second protection ring 606, thereby forming a smooth surface on the inner circumferential surface of the protection cover 8, so that a centrifugal force during rotation of the rotor 601 is applied thereto further uniformly. Thus, stress is prevented from being applied in a concentrated manner to a part of the protection cover 8, and a shearing force due to the centrifugal force is prevented from acting on the protection cover 8, whereby the same effects as in embodiment 1 can be further assuredly obtained. In addition, wrinkles due to stepped portions or irregularities are hardly formed at the time of winding the CFRP or GFRP, and thus the protection cover 8 having high strength and high reliability can be obtained.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

100 rotary electric machine
1, 1A, 1C, 301, 401, 601 rotor
2 shaft
3 core
3A flange
4 permanent magnet
4A lower permanent magnet
4B upper permanent magnet
5 spacer
6A first protection ring
6, 606 second protection ring
6B protection ring
8 protection cover
8A fiber bundle
9 thin plate member
K space
13, 613 end surface stepped portion
14 coating
20 dedicated jig
20A pressure jig
20B end restricting jig
20C end holding jig
30 rotational driving device
31 core
40, 40A, 340 magnet assembly
50 stator

The invention claimed is:

1. A rotor comprising:
    a plurality of permanent magnets provided so as to be divided in a circumferential direction around a shaft;
    a protection ring for positioning and holding ends of the permanent magnets; and
    a protection cover covering outer circumferential surfaces of the permanent magnets and an outer circumferential surface of the protection ring that is along the outer circumferential surfaces of the permanent magnets, wherein the protection cover is formed from a fiber bundle of carbon fiber reinforced plastic (CFRP) helically wound in an axial direction from a winding start end to a winding finish end, at an end in the axial direction of the protection ring and the protection cover, a stepped portion is formed which is annularly recessed in the axial direction on an outer circumferential side, an end surface in the axial direction of the protection cover of the stepped portion is a cut surface of the CFRP fibers at the winding finish end on the outermost layer surface of the CFRP removed, and only the stepped portion including the end surface in the axial direction of the protection ring and the cut surface as the axial end of the protection cover is coated with a first resin.

2. The rotor according to claim 1, further comprising a thin plate member made of a nonmagnetic material and having a cylindrical shape, the thin plate member being interposed between the outer circumferential surfaces of the permanent magnets and an inner circumferential surface of the protection cover.

3. The rotor according to claim 1, further comprising a spacer between the permanent magnets adjacent to each other in the circumferential direction among the plurality of permanent magnets, the spacer filling a gap between the permanent magnets.

4. The rotor according to claim 1, wherein
the permanent magnets and the protection ring are bonded to the shaft by an adhesive agent.

5. The rotor according to claim 1, wherein
the permanent magnets and the protection ring are bonded to a cylindrical core fitted around the shaft, by an adhesive agent.

6. The rotor according to claim 5, wherein
the core has, at one end in the axial direction, a flange protruding in the radial direction, and
an other protection ring is in contact with the flange in the axial direction.

7. A rotary electric machine comprising:
a stator; and
the rotor according to claim 1, the rotor being supported rotatably about an axis, on an inner side of the stator.

8. The rotor according to claim 1, wherein
the fiber bundle helically wound is made of carbon fiber reinforced plastic or glass fiber reinforced plastic.

9. The rotor according to claim 1, wherein
the protection ring positions and holds ends in the axial direction of the permanent magnets,
the rotor further comprising another protection ring for positioning and holding other ends in the axial direction of the permanent magnets.

10. The rotor according to claim 8, wherein
the protection ring positions and holds ends in the axial direction of the permanent magnets,
the rotor further comprising another protection ring for positioning and holding other ends in the axial direction of the permanent magnets.

11. The rotor according to claim 8,
further comprising a thin plate member made of a non-magnetic material and having a cylindrical shape, the thin plate member being interposed between the outer circumferential surfaces of the permanent magnets and an inner circumferential surface of the protection cover.

12. The rotor according to claim 9,
further comprising a thin plate member made of a non-magnetic material and having a cylindrical shape, the thin plate member being interposed between the outer circumferential surfaces of the permanent magnets and an inner circumferential surface of the protection cover.

13. The rotor according to claim 8,
further comprising a spacer between the permanent magnets adjacent to each other in the circumferential direction among the plurality of permanent magnets, the spacer filling a gap between the permanent magnets.

14. The rotor according to of claim 9,
further comprising a spacer between the permanent magnets adjacent to each other in the circumferential direction among the plurality of permanent magnets, the spacer filling a gap between the permanent magnets.

15. The rotor according to claim 8, wherein
the permanent magnets and the protection ring are bonded to the shaft by an adhesive agent.

16. The rotor according to claim 8, wherein
the permanent magnets and the protection ring are bonded to a cylindrical core fitted around the shaft, by an adhesive agent.

17. A rotary electric machine comprising:
a stator; and
the rotor according to claim 8, the rotor being supported rotatably about an axis, on an inner side of the stator.

18. The rotor according to claim 1, wherein
the end surface in the axial direction of the protection ring at the stepped portion and the cut surface as the axial end of the protection cover at the stepped portion are at the same positions in the axial direction.

19. The rotor according to claim 1, wherein
the fiber bundle is fixed with a second resin.

20. A method for manufacturing a rotor including a plurality of permanent magnets provided so as to be divided in a circumferential direction around a shaft, a protection ring for positioning and holding ends of the permanent magnets, and a protection cover covering outer circumferential surfaces of the permanent magnets and an outer circumferential surface of the protection ring that is along the outer circumferential surfaces of the permanent magnets, wherein the protection cover is formed from a fiber bundle helically wound in an axial direction, at an end in the axial direction of the protection ring and the protection cover, a stepped portion is formed which is annularly recessed in the axial direction on an outer circumferential side, and only the stepped portion is coated with a first resin, the method comprising:

a pressure step of bringing the plurality of permanent magnets and the protection ring into close contact with each other in an axial direction, the plurality of permanent magnets being provided so as to be divided in a circumferential direction around the shaft, the protection ring positioning and holding ends in the axial direction of the permanent magnets;

a winding step of winding the fiber bundle around the outer circumferential surfaces of the permanent magnets and the protection ring, helically in the axial direction, while the fiber bundle is being impregnated with a second resin for adhesion;

a cutting step of forming the stepped portion at an end on a winding finish side of the fiber bundle by cutting both the protection ring and the protection cover together to remove a winding finish end of a carbon fiber reinforced plastic on the outermost layer of the protection cover so that the stepped portion is flat in a radial direction; and a coating step of coating only an end surface in the axial direction of the stepped portion with the first resin.

* * * * *